Aug. 4, 1970      Y. J. TALBOT      3,522,584
REARVIEW MIRROR ASSEMBLY FOR MOTOR VEHICLES
Filed March 17, 1967      2 Sheets-Sheet 1
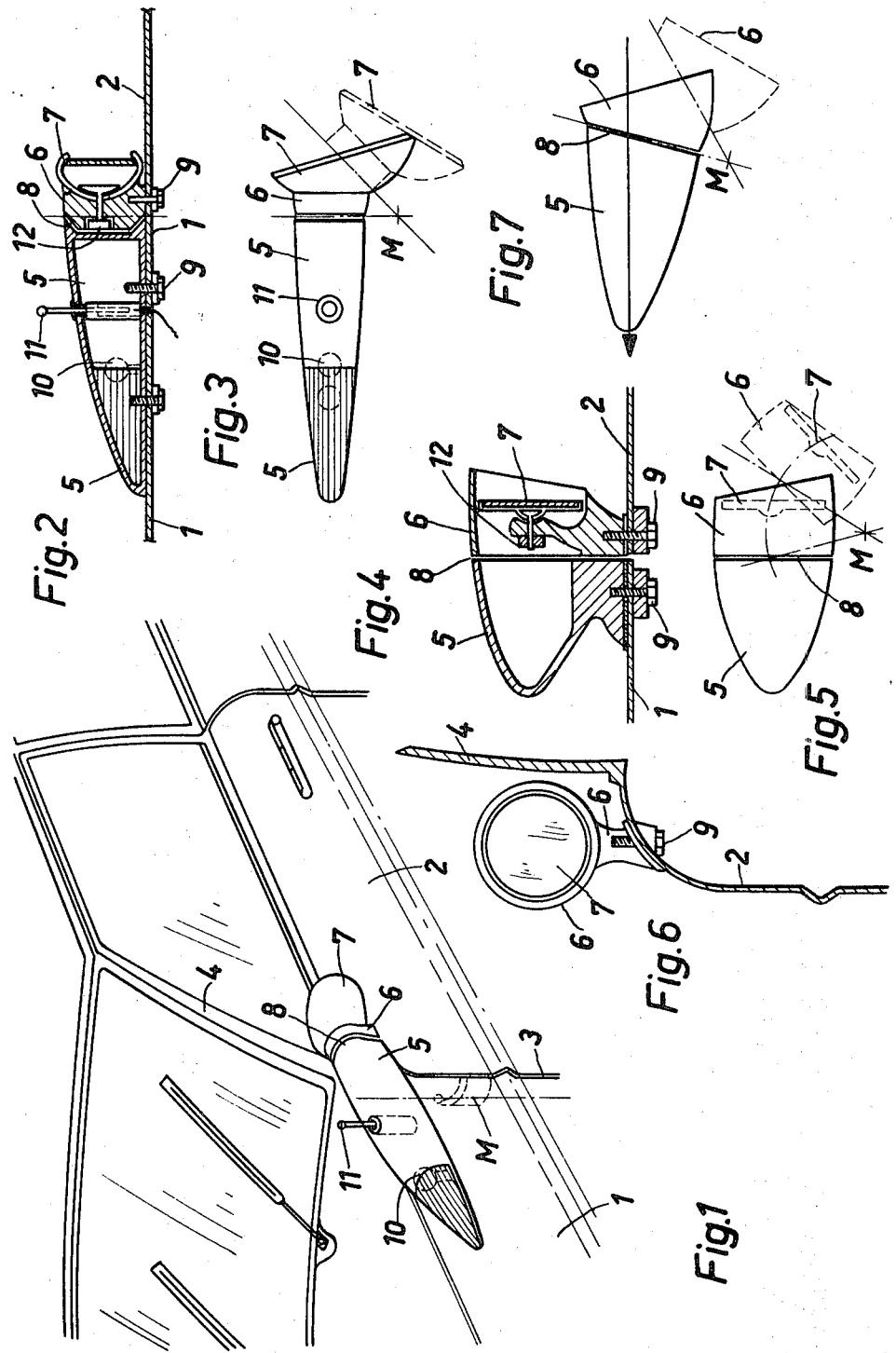
Inventor:
Yorck Joachim Talbot
By Michael S. Striker
Attorney

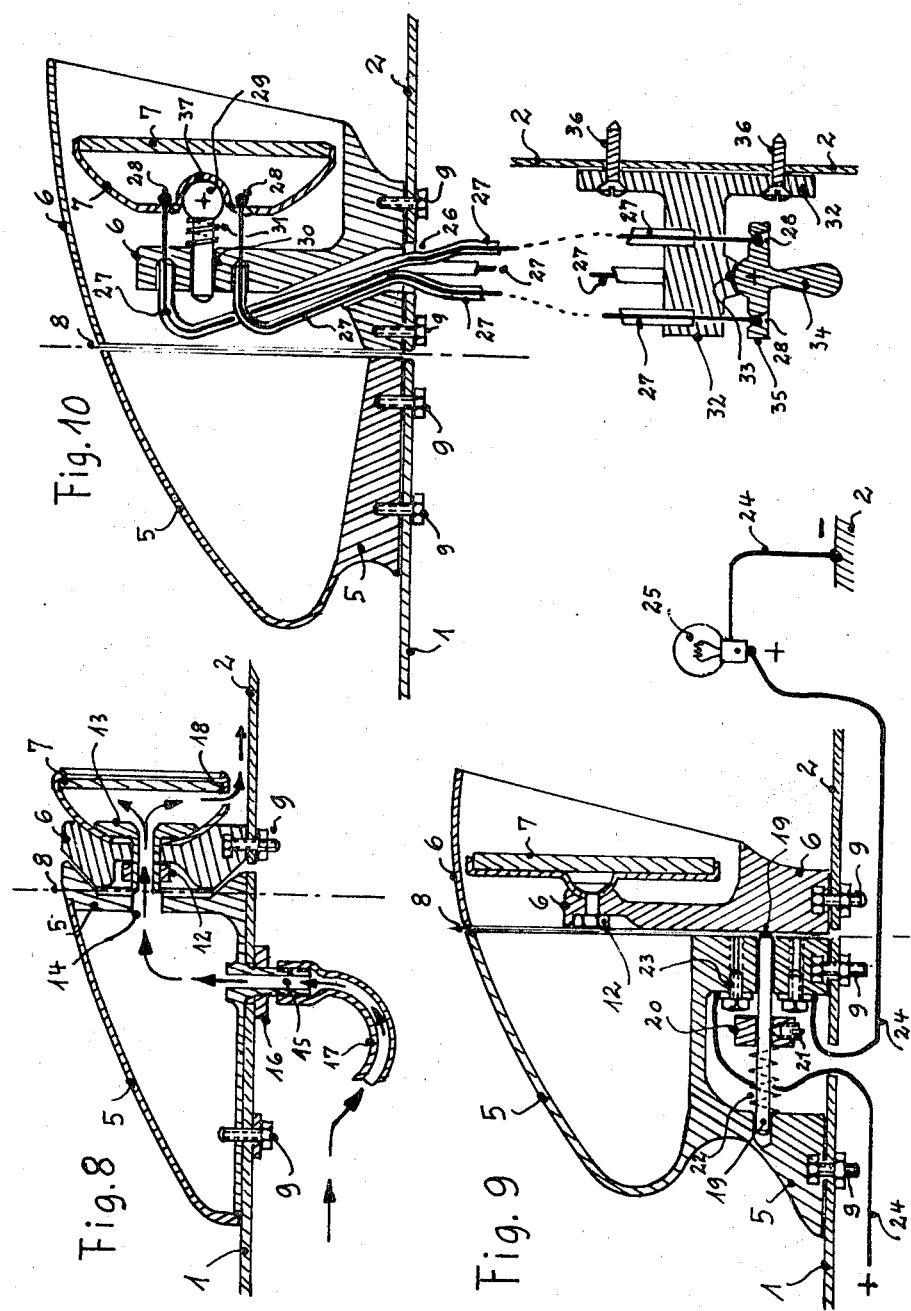

United States Patent Office 3,522,584
Patented Aug. 4, 1970

3,522,584
REARVIEW MIRROR ASSEMBLY FOR
MOTOR VEHICLES
Yorck Joachim Talbot, 7 Ballenstedterstrasse,
1000 Berlin 31, Germany
Filed Mar. 17, 1967, Ser. No. 623,862
Claims priority, application Germany, Mar. 18, 1966,
T 30,715
Int. Cl. B60q 1/00
U.S. Cl. 340—98                                     9 Claims

ABSTRACT OF THE DISCLOSURE

A rearview mirror adapted for exterior use in motor vehicles. The device has a streamlines shape so as to offer minimum air resistance when the motor vehicle is in motion. The rearview mirror is directly mountable and accessible within the region of the front doors of the motor vehicle.

BACKGROUND OF THE INVENTION

Conventional rearview mirrors for exterior use have substantially long backward portions of their housing which are also either directly or indirectly supported by a relatively and equally long base member. In some designs, this base member which is ordinarily secured to the body of the car, is omitted. Conventional rearview mirrors were until now, usually mounted either within the front third portion of the motor vehicle, or displaced more or less from the windshield glass. In the latter configuration the rearview mirror would be mounted along the front edge of the side of the windshield. In other designs, the rearview mirror would be mounted upon the front door directly behind the windshield glass. In the latter arrangement the mirror would be mounted so that the driver could adjust the mirror by lowering his window, without having to step out of the car. This construction, of course, also permits the cleaning of the mirror from within the car.

If the intersection of the front portion of the body and the front door, were hinged, or considered as a dividing line, an advantageous arrangement may be realized by mounting the exterior rearview mirror in front of this dividing line, when viewed from the normal moving direction of the vehicle. Thus, with such an arrangement the driver need move his head by only a small amount in order to observe the traffic behind his vehicle. A disadvantage of this arrangement, however, is that the driver cannot reach, with his hand, the mirror without stepping out of the car, when the mirror is mounted in from of the windshield.

In other arrangements the exterior rearview mirror may be mounted behind this dividing line, and to be within easy reach by the driver. However, in order to reduce the air resistance, the mirror designs have relatively long portion which involve equally long portions of the back end of the mirror wherein the mirror glass or reflecting surface is retained. In these arrangements, the disadvantageous feature prevails whereby the driver must stretch his neck considerably in order to observe the traffic, behind him in the mounted mirror. Such relatively severe movement of the head and stretching of the neck is especially dangerous in todays traffic at high speeds. Accordingly it is undesirable to require that the driver deviate his line of sight considerably from the normal driving direction.

Accordingly it is an object of the present invention to provide a rearview mirror having a streamlines design from the aerodynamic point of view, and having features whereby the disadvantages inherent in conventional designs are avoided. It is the object of the present invention that even though the mirror may have a relatively long extension in order to provide for minimum air resistance while the vehicle is in motion, an elongated part of the mirror body be stationary with respect to the body of the vehicle when the front door is opened.

The invention solves the problem in a novel manner by providing an exterior rearview mirror assembly comprising essentially two parts situated close together and being aligned when the mirror is in use. The two parts of the mirror assembly are not physically secured together. The front portion of the mirror assembly, in accordance with the present invention, is secured to the body of the vehicle, while the back part of the mirror is secured to the door. When the door is opened, the back part of the mirror separates from its counter front part, which remains stationary, and moves along a circle whose center is the pivot axis of the hinges of the door of the motor vehicle. Upon closing the door the back portion of the mirror retraces its path and becomes adjacently located again close to the front portion of the mirror.

In various embodiments of the present invention, the line of separation between the front and back portions of the mirror may lie in the same vertical plane, or not, as the dividing line between the body of the vehicle and the front door. The embodiments of the invention also permit that the axis about which the hinges supporting the door pivot, lie either within or outside of the vertical plane through the gap separating the front and back portions of the mirror. Thus, this pivoting axis may lie either behind or in front of this vertical plane through the separating gap of the two portions of the mirror.

A further novel feature of the invention resides in that the front portion of the mirror which remains stationary with the opening and closing of the door, may accommodate auxiliary parts such as radio antennas, window sprayers, tank filling plugs, or a flashing light system. In the event that the latter feature is installed, it is desirable that the frontal portion of the mirror be made of transparent material.

The novel design of the two-part rearview mirror, in accordance with the present invention, allows that the stationary front portion of the mirror be integrally formed directly with the body of the motor vehicle. This construction has an advantage over that in which the stationary front portion is separately manufactured and secured to the body by means of screws. In such a design, the extended frontal portion of the mirror contains a cavity in which it is possible to securely retain tools, or the like, with the door closed. This results from the condition that when the motor vehicle is locked, the back portion of the mirror covers the cavity within the front portion, and thereby prevents access to the contents therein. This same construction which protects, in this manner, the contents within the cavity of the front portion of the mirror, also prevents any unintentional adjustment of the rearview mirror. For example, the orientation of the mirror can be altered only when the door is opened, giving thereby access to the back of the mirror.

A further feature of the present invention, permits the introduction of heated air into the cavity of the front portion of the mirror so that the formation of any ice or dust on the mirror is prevented during normal driving conditions.

Another novel feature of the invention resides in the arrangement wherein a switch is included in the mirror construction, so that when the door is opened a warning light is turned on, within the back portion of the mirror arrangement. This light is made so as to project a beam towards the rear of the car.

The invention may, finally, include the feature whereby the back portion of the exterior rearview mirror is equipped with automatic remote control means in the form of hydraulic and/or electrical controlling equipment. Through such a remote control arrangement the driver may adjust the back portion of the mirror without having to lower the window and reach out with his arm to accomplish this task. Since such remote control equipment is well known to the art, it is not further described here.

SUMMARY OF THE INVENTION

The present invention contemplates a streamlined exterior rearview mirror assembly for motor vehicles, comprising, in combination, a streamlined frontal part secured to the body of the motor vehicle, and a back part separate from the frontal part and including a mirror, the back part being secured to a door of the vehicle in close proximity to the frontal part, so as to form a substantially streamlined body when the door is closed, while when the door is opened the back part moves with the door and away from the frontal part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a partial isometric view showing a motor vehicle equipped, at its left exterior side, with an external rearview mirror, in accordance with the present invention;

FIG. 2 is a cross-sectional view of the rearview mirror of FIG. 1, and shows the internal constructional detail of the assembly;

FIG. 3 is a plan view of the mirror of FIG. 1, and shows its positional relationship when the front door of the motor vehicle is open;

FIG. 4 is a cross sectional view showing another embodiment of the rearview mirror of FIG. 1;

FIG. 5 is a plan view of the embodiment of FIG. 4 and shows the positional relationship of the mirror assembly when the front door of the motor vehicle is open;

FIG. 6 is an end view of the mirror assembly of FIG. 1, and shows the manner in which the mirror assembly is secured to the door of the motor vehicle;

FIG. 7 is a further embodiment of the external rearview mirror, of FIG. 1, in plan view and shows the position of the parts of the mirror assembly when the front door of the motor vehicle is open;

FIG. 8 is a cross-sectional view of the assembly of FIG. 2 and shows the adapted construction for conducting heated air to the front portion of the mirror assembly;

FIG. 9 is a cross-sectional view of the assembly of FIG. 4 when adapted to actuate a switch when the door of the motor vehicle is opened, and to light a lamp to indicate such opening of the door; and FIG. 10 is a cross-sectional view of the mirror assembly of FIG. 4 when adapted for remote control in which the mirror is adjusted from the interior of the motor vehicle without opening of the window.

DESCRIPTION OF THE PREFERRED EMBODIMENTS

Referring to the drawing, and in particular to FIG. 1, the door 2 of a motor vehicle is pivotally secured to the body 1 by means of hinges which have a pivoting axis coinciding with the axis designated M. A spatial separation 3 prevails between the body 1 and the door 2. Secured to the body 1, is the streamlined frontal portion 5 of a rearview mirror. The relatively short back portion 6 of the rearview mirror, is secured to the door 2 next to the side post 4. A mirror holder 7 is adjustably mounted adjacent to the mirror part 6. A space prevails between the front and back portions of the rearview mirror.

When the door 2 is opened, the back portion 6 as well as the mirror holder 7 move rotatably about the axis M and away from the front panel portion 5. In conjunction with these elements, a light flasher 10 and/or radio antenna 11 may be built into the device. The frontal portion 5 of the mirror assembly, can be made of transparent material. Such transparency may be confined to the light portion 10 or may prevail for the entire frontal portion. At the same time colored material may be used in this construction.

Referring to FIGS. 2 and 3, the separating space 8 resides between the front and back portions, 5 and 6 respectively, of the rear view mirror. The views are taken in the vertical plane through the axis M. In FIG. 3, the dashed lines indicate the positions of the back portion 6 as well as the mirror holder 7, when the door 2 has been opened. The two portions 5 and 6 can possess either planar surfaces or conical surfaces where they are separated by the space 8.

FIGS. 4, 5 and 6 shows a further embodiment of the two-part rearview mirror, in accordance with the present invention. In this embodiment the streamlined frontal mirror portion 5 is also secured by means of screws 9 to the body 1 of the motor vehicle. The back portion 6 is similarly secured to the door by the screws 9. A mirror holder 7 is mounted adjustably within the back portion 6. This holder is secured in place by means of the nut 12 which is exposed only when the door 2 is in the open position. Thus, the mirror holder 7 may be adjusted or moved to a desired position, when the door is opened, by loosening the nut, and then retightening it again to fix the mirror in position. The cavity within the frontal portion may be adapted to retain or carry small items which would be protected by the closure of the door.

The pivot axis M lies also, in this embodiment, outside of the vertical plane through the separation 8 between the frontal and back portion, 5 and 6 respectively, of the rearview mirror. The dashed lines in FIG. 5, also indicate the position of the back portion 6 when the door is opened by pivoting about the axis M and moving the portion 6 away from the portion 5.

FIG. 7 shows an embodiment in which the pivot axis lies directly within the vertical plane through the spatial separation 8. However, unlike the preceding embodiments, this vertical plane or space 8 is angularly disposed to the axis of motion indicated by the arrow in FIG. 7. Thus, whereas the face or joint 8 is oriented at an angle of 90° with respect to the axis or direction of motion, in all of preceding embodiments, the space 8 is not perpendicularly disposed to the direction of vehicle motion in FIG. 7. The relative inclination is clearly shown in the drawing. The direction of motion of the vehicle corresponds normally to the longitudinal axis of the vehicle. The dashed lines in FIG. 7 also show the position of the back portion of the exterior rearview mirror, when the door 2 is in the open position.

FIG. 8 shows the assembly of FIG. 2 adapted to the construction in which heated air is conducted to the front portion of the mirror assembly. Thus, through the tube 17 shown in FIG. 8, heated air is introduced into the chamber of the frontal portion 5. Such heated air may be realized from the conventional heated air supply of a motor vehicle. By means of the path defined by the guiding arrows in FIG. 8, the heated air is admitted to the back of a mirror 7 where it impinges upon the mirror body and raises, thereby, the temperature of the mirror. Continuous flow of the heated air though the chamber in back of the mirror 7, is achieved through the opening 18 which forms an exit opening for the excess heated air after having impinged upon the back surface of the mirror 7.

FIG. 9 is the assembly of FIG. 4 when adapted to actuating a switch when the door of the motor vehicle is opened, and to indicate this condition through the lighting of a lamp. Thus, when the door of the car is opened, the rod 19 is moved by the spring 22 so as to engage the movable contact 20 with and against the fixed contacts 23. When the contact 20 bears against these two fixed contacts 23, when the door is opened, the contacts 23 are short-circuited, and a continuous circuit prevails through the lamp between the positive potential of the battery and its corresponding negative potential. The circuit through the lamp is represented by the conducting path 24 which contains the lamp 25 in series. When the door is closed, on the other hand, the portion 6 of the mirror assembly forces the rod 19 against the action of the spring so as to disengage the movable contact 20 from the fixed contacts 23. Under this condition, open circuit condition prevails, and the lamp 25 is turned off.

FIG. 10 shows the construction of a remote control arrangement for controlling or adjusting the mirror from within the car without having to lower the window and reach out for the purpose of accomplishing this task. The remote adjustment of the mirror is accomplished through the flexible cables 27 which are joined, at one end, to the mirror 7. The other ends of the flexible cables or flexibles shafts 27 are secured to the freely-movable adjusting member 34 within the car. The driver by gripping the member 34 can adjust and orient the mirror 7 to any desired angle. The flexible shafts 27 pass through an opening 26 within the body 2, so that the adjusting member 34 may be manually operated from within the car without having an windows opened.

It will be understood that each of the elements described above, or two or more together, may also find a useful application in other types of external rearview mirrors in motor vehicles differing from the types decsribed above.

While the invention has been illustrated and described as embodied in an external rearview mirror in motor vehicles, it is not intended to be limited to the details shown, since various modifications and structural changes may be made without departing in any way from the spirit of the present invention.

What is claimed as new and desired to be protected by Letters Patent is set forth in the appended claims.

1. A streamlined exterior rearview mirror assembly for motor vehicles, comprising, in combination, a streamlined frontal part secured to the body of the motor vehicle; and a back part separate from said frontal part and including a mirror, said back part being secured to a door of said vehicle in close proximity to said frontal part, so as to form a substantially streamlined body when the door is closed, while when the door is opened said back part moves with said door and away from said frontal part.

2. The streamlined exterior rearview mirror assembly as defined in claim 1 wherein the plane of separation between said frontal part and said back part lies within the same vertical plane as the dividing line between the body of said motor vehicle and said door of said vehicle.

3. The streamlined exterior rearview mirror assembly as defined in claim 1, wherein the plane of separation between said frontal part and said back part lies in a different vertical plane from the dividing line between the body of said motor vehicle and said door of said vehicle.

4. The streamlined exterior rearview miror assembly as defined in claim 1 including a lamp mounted within said frontal part, the body of said frontal part being constructed of light-transmitting material.

5. The streamlined exterior rearview mirror assembly as defined in claim 1 including a radio antenna mounted on said frontal part secured to the body of said motor vehicle.

6. The streamlined exterior rearview mirror assembly as defined in claim 1 wherein said frontal part is integrally constructed and shaped with said body of said motor vehicle, said frontal part having an opening coinciding with the plane through the dividing line between said body of said vehicle and said door of said vehicle, said opening being substantially covered by said back part when said door is closed.

7. The streamlined exterior rearview mirror assembly as defined in claim 1 including conducting means for conducting warm air into the interior of said frontal part from said motor vehicle to prevent the formation of ice and dust on said mirror.

8. The streamlined exterior rearview mirror assembly as defined in claim 1 including an electrical switching contact mounted between said frontal part and said back part; and a lamp electrically connected to said switching contact so that when said door is opened said lamp is turned on to provide a warning signal.

9. The streamlined exterior rearview mirror assembly as defined in claim 1 including remote control means for adjusting said back part with said mirror remotely from within said motor vehicle.

References Cited

UNITED STATES PATENTS

| 1,934,998 | 11/1933 | Stahlknecht | 240—7.1 |
| 2,457,348 | 12/1948 | Chambers | 340—98 |
| 3,265,878 | 8/1966 | Talbot | 240—4.2 |

THOMAS B. HABECKER, Primary Examiner

M. SLOBASKY, Assistant Examiner

U.S. Cl. X.R.

240—4.2; 340—87